July 8, 1952 V. S. JOHNSTON 2,602,712
LUBRICATED SHAFT BEARING
Filed Sept. 23, 1947
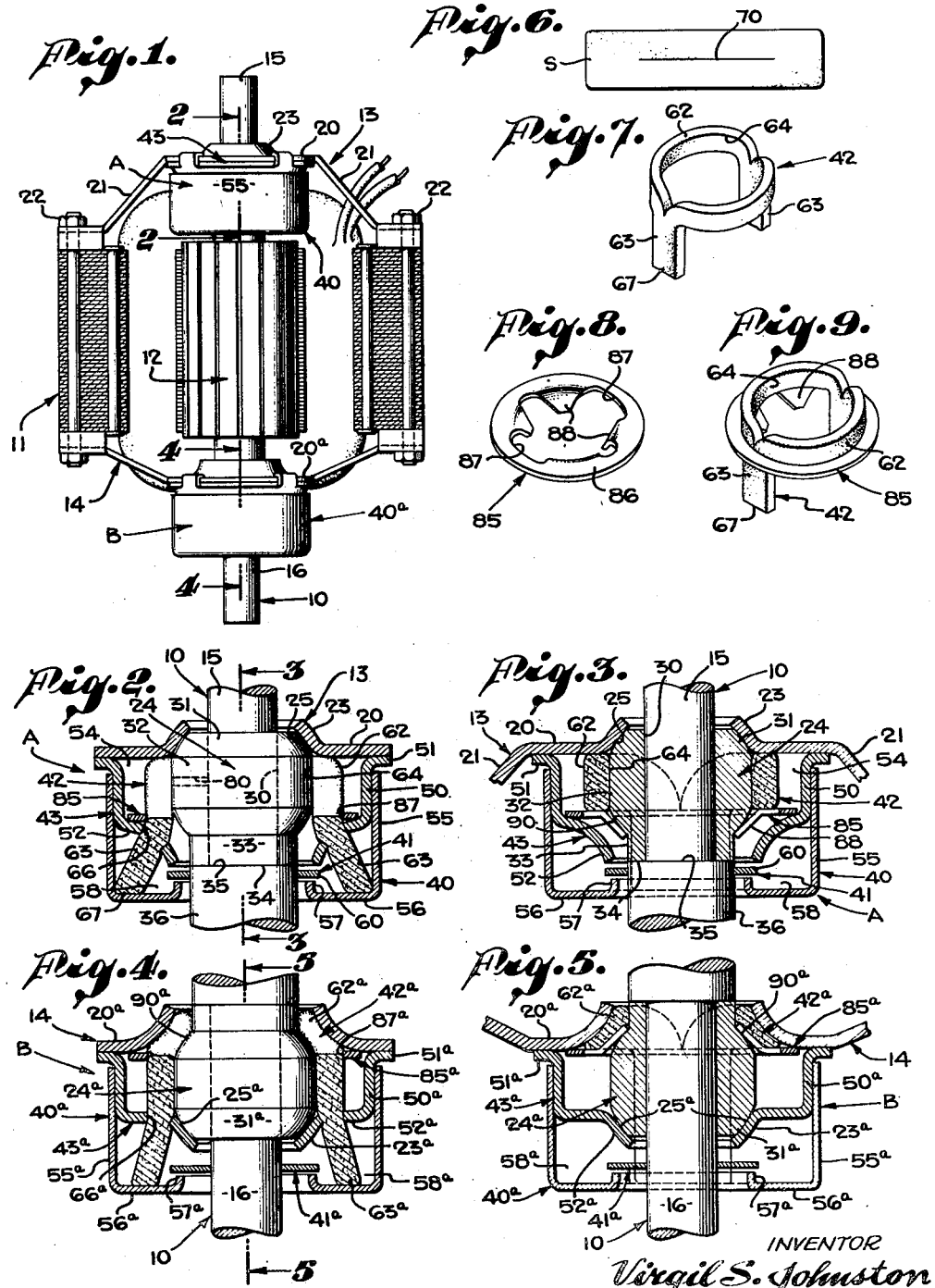
INVENTOR
Virgil S. Johnston
BY
[signature]
ATTORNEY Patented July 8, 1952

2,602,712

UNITED STATES PATENT OFFICE 2,602,712

LUBRICATED SHAFT BEARING

Virgil S. Johnston, Glendale, Calif., assignor of one-half to Joseph R. Broadbent, Huntington Park, Calif.

Application September 23, 1947, Serial No. 775,694

5 Claims. (Cl. 308—134.1)

This invention has to do with a lubricated shaft bearing and is more particularly concerned with a structure useful on shafts or in connection with bearings supporting shafts which are so arranged that lubricant cannot be effectively held in ordinary lubricated bearing structures. It is a general object of the present invention to provide such a structure, that is, to provide a lubricated vertical shaft bearing that is simple and effective and yet inexpensive of construction.

Difficulty is experienced in properly lubricating bearings of shafts which are arranged other than horizontally, for example, the bearings of a vertically disposed motor shaft, since gravity tends to work lubricant down such a shaft away from the bearings. In time the bearings of such a shaft become dry and may be injured or destroyed by use of the motor that is well within its normal capacity. Difficulty such as is referred to is characteristic of small or fractional horse power electric motors where the bearings are simple and limited as to size, and where little or no care or attention is given to the matter of lubrication.

It is a general object of this invention to provide a bearing structure for a vertical shaft in which lubricant flowing down from the bearing is caught and returned to the bearing so that a constant circulation is maintained as the shaft operates, all with little or no loss of lubricant.

Another object of my present invention is to provide a structure of the general character referred to in which capillary flow or wick action is employed to circulate lubricant from the lower end of a vertical bearing to the upper end thereof.

It is another object of the invention to provide a structure of the type referred to employing an annular cup beneath the bearing proper to hold a supply of lubricant which feeds a wick carrying the lubricant to the bearing, which cup is supplied by lubricant flowing down from the bearing by a lubricant catcher on the shaft beneath the bearing.

It is a further object of this invention to provide a bearing construction of the general character which is inexpensive of construction and yet highly effective and dependable. The structure of the present invention involves but few simple parts easily manufactured and assembled and it is such that when once supplied with lubricant it will operate dependably over a very long period of time.

It is another object of this invention to provide a unique simple wick in a bearing construction of the type referred to which wick is of simple, effective form and is inexpensive of manufacture.

The various objects and features of my invention will be fully understood from the following detailed description of typical preferred forms and applications of the invention, throughout which description reference is made to the accompanying drawings, in which:

Fig. 1 is a sectional view of a simple typical vertical electric motor showing the present invention applied to both the upper and lower bearings carrying the motor shaft. Fig. 2 is an enlarged detailed sectional view of the upper bearing, being a view taken as indicated by line 2—2 on Fig. 1. Fig. 3 is a sectional view of the structure shown in Fig. 2, taken as indicated by line 3—3 on Fig. 2. Fig. 4 is an enlarged detailed sectional view of the lower bearing, being a view taken as indicated by line 4—4 on Fig. 1. Fig. 5 is a sectional view of the structure shown in Fig. 4, being a view taken as indicated by line 5—5 on Fig. 4. Fig. 6 is a plan view of the wick showing it in blank form and before being shaped to accommodate the other parts of the structure. Fig. 7 is a perspective view of the wick shown in Fig. 6 in the shape that it takes when in place with the other parts. Fig. 8 is a perspective view of a wick holder that may be employed in carrying out the present invention, and Fig. 9 is a perspective view of the wick holder shown in Fig. 8 showing it carrying a wick such as is shown in Fig. 7.

The present invention is applicable, generally, to shaft bearings or shaft bearing constructions where the arrangement of the shaft is such that lubricant tends to flow along the shaft and away from the bearing. Since such a condition prevails in the case of a vertically disposed electric motor I have elected to illustrate the invention as applied to such an electric motor and since the invention is highly practical and of particular economic value as applied to fractional horsepower motors, I have, for purpose of example, illustrated a very simple motor construction such as is commonly found in small electric motors. It is to be understood that my invention contemplates other forms and applications of the structure provided and that for this reason the particular details about to be described are not to be construed as limitations upon the invention.

The particular motor illustrated in the drawings is intended primarily for operation in a vertical position, that is, with its shaft 10 vertically disposed as shown in Fig. 1. The motor involves, generally, a stationary body or field 11 and an armature 12 operating within the field. Upper and lower end frames 13 and 14, respectively, are joined to or carried by the stator or field. An upper bearing A is carried by the upper frame 13 to support the upper end portion 15 of the motor shaft 10 while a lower bearing B is carried by the lower frame 14 to support the lower end portion 16 of the shaft 10.

The upper frame 13 is shown as including a central plate 20 through which the shaft portion 15 is passed and legs 21 which project from the plate 20 and are secured to the ends of the field element, as by means of fastening devices 22. The frame 20 carries a seat 23 which supports the bearing sleeve 24 surrounding the shaft portion 15. In the case of the upper frame which I now refer to the seat 23 is formed directly on or as a part of the plate 20, as by suitably forming or shaping the central portion of the plate so that it has a seat portion with the desired concave or spherical seat 25 receiving the bearing sleeve 24. The seat is formed or struck upwardly from the plate so that the face 25 that carries the bearing faces downwardly, as clearly illustrated in Fig. 2 of the drawings.

The bearing sleeve 24 may be of any desired form or construction. Since the motor being described is a simple small motor the bearing sleeve 24 is shown as a simple annular or continuous member of suitable bearing material, having a bore 30 in which the shaft 15 rotates and having a circumferentially formed upper end portion 31 shaped to fit into the seat 23 to have seating engagement against the face 25 of the seat. It is advantageous in practice to form the bearing sleeve of porous or oil absorbent material such as is commonly used in the bearings of motors and the like. The bearing sleeve has a central portion 32 the exterior of which is turned to be uniform in diameter throughout its length. At its lower end the bearing sleeve has a reduced lower end portion 33 presenting a shoulder 34 engaging the upper end 35 of the enlarged central portion 36 of the motor shaft, which portion of the motor shaft carries the armature 12.

My construction provides elements operating in conjunction with those thus far described, which elements include, generally, a cup 40, a lubricant catcher 41, and a wick 42. The invention further provides means maintaining the wick in proper position with reference to the bearing sleeve 24 and the cup 40. In the case illustrated the means holding the wick includes a bracket 43 which also serves as a means by which the cup is attached to the plate.

In the general arrangement illustrated the upper end of the bearing sleeve 24 engages the seat at the plate 20 and the bearing sleeve depends from or below the plate 20. In such case the cup 40 is supported to depend downwardly around the bearing sleeve to a point well below the bearing sleeve and the lubricant catcher 41 is mounted on the motor shaft below the bearing sleeve and is related to the cup so that lubricant flowing down from the bearing reaches the catcher and is deposited by the catcher into the cup.

The bracket 43 shown in the drawings has an annular body portion 50 joined to the lower side of plate 20 as by a flange 51, and it has a downwardly and inwardly formed skirt portion 52 continuing from the lower end of the body portion 50. The body portion 50 of the bracket is considerably larger in diameter than the bearing sleeve 24 which it surrounds, leaving a wick chamber 54 around the bearing sleeve. The skirt portion 52 of the bracket extends downwardly and inwardly to a point about opposite the lower end of the bearing sleeve where it surrounds the bearing sleeve with considerable clearance, as clearly illustrated in Fig. 2 of the drawings.

The cup element 40 has a cylindrical outer wall 55 carried by the bracket 43 and depending therefrom. The cup further includes a bottom 56 which extends inwardly from the lower end of the outer wall to a point close to the shaft. An annular upwardly projecting lip 57 is provided at the inner periphery of the bottom 56 extending upwardly around the shaft with substantial clearance and cooperating with the bottom 56 and outer wall 55 to define an annular lubricant trough 58 around the shaft. In the arrangement illustrated the upper end portion of the outer wall 55 fits tightly over the body 50 of bracket 43, providing a frictional engagement between these parts so that when the cup has been arranged in place it remains in operating position. The wall 55 extends down to a point opposite the upper end portion of the enlarged central part 36 of the shaft 10. The trough 58 is thus established around the upper end portion of the central shaft part 36. The lip 57 of the cup is of limited vertical extent and terminates short of the skirt 52 of the bracket so that there is a space between these parts.

The lubricant catcher 41 is carried on the shaft to operate therewith and in the preferred arrangement it may be a simple flange-like element tight on the shaft to project radially therefrom at the space that occurs between the lip 57 and the lower end of the skirt 52. The flange-like catcher is somewhat larger in diameter than the lip 57 so that the outer peripheral edge 60 of the catcher overhangs or overlies the trough 58. In practice I prefer to press or otherwise make the catcher tight on the shaft, for instance, on the shaft portion 36, with the result that lubricant from bearing sleeve 24 flowing down on the shaft reaches the catcher 41 and as the shaft rotates such lubricant is thrown out on the catcher to be discharged from the periphery of the catcher so that it is caught by the cup to accumulate in the trough 58.

The wick 42 as it occurs in the structure hereinabove described, is shaped as shown in Fig. 7. In accordance with my invention the wick is formed of a porous material such as felt or the like, and it has an annular body portion 62 fitting snugly around the bearing sleeve and it has one or more depending legs 63 depending from the body portion and into the trough 58 of the cup 40. In accordance with my invention I prefer to form the wick of an elongate strip S of soft felt or other material having capillary action and I provide such strip of material at a point intermediate its ends with a slit 70 so that the portion of the strip in the vicinity of the slit may be spread to form the annular body 62. Where but one leg 63 is required the slit 70 may be located adjacent one end of the strip. However, where two legs are provided, as shown in Fig. 7, the slit 70 is located midway between the ends of the strip.

The slit 70 is made of sufficient length so that the material in the vicinity of the split can be readily spread or formed into the annular body 62 having a central opening 64 receiving the bearing sleeve. In the case illustrated the opening 64 is shown receiving the middle portion 32 of the bearing sleeve. The leg or legs 63 of the wick, as the case may be, depend from the body, that is, from the outer peripheral portion of the body 62, and where a skirted portion 43 is provided, as above described, the skirt 52 of the bracket is provided with openings 66 passing the legs of the wick. It is preferred that the lower ends 67 of the wick not only enter the trough 58 but that they be such as to bear upon the bottom of the trough as shown in the drawings.

Through the construction that I have provided lubricant deposited in the trough 58 by the catcher 41 is taken up by the wick 42 and through capillary action feeds upwardly to the body 62 of the wick which deposits it onto the bearing sleeve. Lubricant thus deposited on the bearing sleeve readily finds its way over the surfaces of the bearing sleeve either to the upper end or the lower end of the bearing, with the result that it reaches the interior of the bearing sleeve where lubrication is required. If desired, one or more radial lubricant feed openings 80 may be provided in the bearing sleeve, preferably at the portion of the sleeve surrounded by the body 62 of the wick, so that lubricant may pass directly from the wick into the interior of the bearing sleeve to work its way between the shaft and the bearing sleeve. When the sleeve is formed of porous material lubricant fed by the wick is taken up by the sleeve to lubricate the bearing surfaces. It is to be observed that I have provided the bracket 43 which serves the dual purpose of holding the cup 40 and also the wick 42. By fitting the leg or legs of the wick through the skirt of the bracket in the proper manner the wick is effectively held in position without choking or retarding flow of lubricant upwardly through the wick.

A holder 85 is preferably provided in the structure thus far described and in the preferred form of the invention the holder 85 serves to hold the bearing sleeve 24 up and in engagement with the seat 23 and it also holds the body portion of the wick up and in proper contact with the bearing sleeve. The holder 85 may be a simple annular part carried in the bracket 43 so that it is supported on the skirt 52 of the bracket. The holder is preferably formed of resilient material, for instance, it may be formed of thin spring steel or the like. The engagement between the holder and the bearing sleeve is established through lips 88 that project inwardly from the inner periphery of the holder and engage a downwardly facing shoulder 90 on the bearing sleeve.

In the particular case illustrated there are two diametrically opposite lips 88 that engage and hold the bearing sleeve and between the lips the inner peripheral portion of the holder is cut away, establishing openings 87 that pass the legs 63 of the wick. It will be understood that the legs of the wick may be suitably fitted or held in the openings 87 and it will be apparent that the body of the wick is confined or held above the holder where it contacts the bearing sleeve.

The structure employed at the lower bearing B is substantially the same as that above described except that at the lower bearing the plate 20$^a$ of the lower frame 14 does not directly carry the seat that supports the bearing. In this case the bracket 43$^a$ has a body 50$^a$ joined to the under side of the plate 20$^a$ as by a flange 51$^a$ and the skirt portion 52$^a$ of the bracket, instead of extending downwardly and inwardly extends inwardly and its inner peripheral portion is shaped to form the seat 23$^a$ so that it has an upwardly facing spherical seating surface 25$^a$. The lower end portion 31$^a$ of the bearing sleeve 24$^a$ is spherically curved and seats downwardly on the seat 23$^a$.

In this form of the invention the cup 40$^a$ may be the same as that above described, that is, it may include an outer wall 55$^a$, a bottom 56$^a$, and an upwardly projecting inner lip 57$^a$, all of which parts define an annular trough 58$^a$ around the shaft. In this case the trough surrounds the lower end portion 16 of the shaft rather than the enlarged middle portion 36 of the shaft. The lubricant catcher 41$^a$ is a flange-like part fixed on the shaft portion 16 to extend outwardly in the space between the upper edge of the lip 57$^a$ and the lower edge of the seat portion 23$^a$. The wick 42$^a$ employed in this form of the invention may be identical with that above described, except that it is shown with the body portion 62$^a$ engaging or embracing the upper end portion of the bearing rather than the middle portion thereof and it is shown as having legs 63$^a$ somewhat longer than the legs 63 above described. The leg or legs of the wick depend through the bracket 43$^a$ and they are shown passing through suitable openings 66$^a$ in the skirt portion 52$^a$ of the bracket.

The holder 85$^a$ employed in connection with the lower bearing B may be substantially the same as the holder 85 hereinabove described, in that it may be a resilient ring carried in bracket 43$^a$ and having lips engaging a shoulder 90$^a$ on the bearing sleeve that is supported by the seat 23$^a$. The holder 85$^a$ may be provided with openings 87$^a$ which pass or accommodate the legs of the wick while the body portion of the wick is supported on or above the holder so that it is maintained in proper contact with the bearing sleeve. From the foregoing description it will be apparent that I have provided a lubricated bearing construction particularly useful as applied to vertical bearings and that my construction involves few simple parts that serve to catch lubricant draining from a bearing and deposit it in an annular trough where it is picked up by a wick to be carried up to the bearing to again flow through the bearing and down for recirculation. It is to be noted that my construction involves no parts subject to wear or deterioration since I provide no running or working parts on which wear occurs. Further, it is to be observed that my construction is such as to provide a suitable reservoir in the annular trough serving to hold an adequate supply of lubricant so that the bearing will operate for a very long period of time without requiring any care or attention whatever.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A lubricator for a bearing on a vertical shaft including, an upwardly opening cup surrounding the shaft and having a lubricant receptacle below the bearing, a lubricant catcher on the shaft below the bearing projecting radially into the receptacle and delivering lubricant from the shaft to the receptacle, and a wick receiving lubricant at the receptacle and delivering it to the bearing, the wick having a complete annular body continuously surrounding and bearing on the periphery of the bearing and a leg depending from the body into the receptacle.

2. In a structure of the character described, a frame having a bearing seat, a bracket supported by and depending from the frame and having a vertically disposed annular part, a bearing supported on the seat, a vertical shaft carried in the bearing, a cup frictionally engaged with and supported by the annular part of the bracket and depending therefrom and having an upwardly opening annular lubricant trough around the shaft below the bearing, a lubricant catcher fixed on the shaft and delivering lubricant from the shaft to the trough, and a wick having a part engaging the bearing and a part in the trough.

3. In a structure of the character described, a frame having a bearing seat, a bearing supported on the seat, a vertical shaft carried in the bearing, a bracket carried by the frame and depending therefrom, the bracket having a fixed vertically disposed annular part, a detachable cup having a part surrounding and carried by said part of the bracket and depending therefrom and having an upwardly opening annular lubricant trough around the shaft below the bearing, a lubricant catcher fixed on the shaft and delivering lubricant from the shaft to the trough, a wick having an annular body surrounding and bearing on the periphery of the bearing and having a leg depending from the body into the trough, and a holder carried by the bracket engaging the bearing and holding it on the seat, the body of the wick being supported on the holder and the holder and bracket having openings passing the leg of the wick.

4. In a structure of the character described, a frame, a bracket fixed to the frame and depending therefrom, a seat at the center of the bracket, a bearing engaging the seat, a vertical shaft carried in the bearing, a cup frictionally engaged with and wholly carried by the bracket and depending therefrom and having an annular upwardly opening trough around the shaft below the bearing, a lubricant catcher on the shaft below the bearing and above the trough and projecting radially into the cup, the catcher receiving lubricant from the shaft and delivering it to the trough, a wick receiving lubricant from the trough and delivering it to the bearing, and a holder carried by the bracket holding the bearing on the seat and the wick in engagement with the periphery of the bearing.

5. In a structure of the character described, a frame having a bearing seat, a bracket supported by and depending from the frame and having a vertically disposed cylindrical part adjacent the frame, a bearing supported on the seat, a vertical shaft carried in the bearing, an upwardly opening cup having an upper annular part frictionally held on said part of the bracket, the cup forming an annular lubricant trough surrounding the shaft below the bearing, a lubricant catcher fixed on the shaft and delivering lubricant from the shaft to the trough, a wick having a part engaging the bearing and a part in the trough, and a holder carried by the bracket and holding the wick in engagement with the bearing.

VIRGIL S. JOHNSTON.

REFERENCES CITED

The following references are of record in the file of this patent:

UNITED STATES PATENTS

| Number | Name | Date |
|---|---|---|
| 297,622 | Nel | Apr. 29, 1884 |
| 403,448 | Saunders | May 14, 1889 |
| 773,935 | Hallock | Nov. 1, 1904 |
| 1,570,356 | Lane | Jan. 19, 1926 |
| 1,656,702 | Finch | Jan. 17, 1928 |
| 2,053,425 | Else | Sept. 8, 1936 |
| 2,060,651 | Allen | Nov. 10, 1936 |
| 2,124,479 | Whitaker | July 19, 1938 |
| 2,171,390 | Bode | Aug. 29, 1939 |
| 2,232,788 | Kitto | Feb. 25, 1941 |
| 2,484,166 | Huston | Oct. 11, 1949 |
| 2,522,985 | Bradley | Sept. 19, 1950 |

FOREIGN PATENTS

| Number | Country | Date |
|---|---|---|
| 369,202 | Germany | Feb. 16, 1923 |